United States Patent
Zhang et al.

(10) Patent No.: US 8,309,045 B2
(45) Date of Patent: Nov. 13, 2012

(54) SYSTEM AND METHOD FOR CONTROLLING EMISSIONS IN A COMBUSTION SYSTEM

(75) Inventors: Tian Xuan Zhang, Overland Park, KS (US); David Michael Chapin, Overland Park, KS (US); Robert Warren Taylor, Ponte Vedra Beach, FL (US); David Kelly Moyeda, Laguna Hills, CA (US); Peter Martin Maly, Lake Forest, CA (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 13/026,166

(22) Filed: Feb. 11, 2011

(65) Prior Publication Data
US 2012/0207657 A1 Aug. 16, 2012

(51) Int. Cl.
*B01D 53/34* (2006.01)
*B01D 53/74* (2006.01)

(52) U.S. Cl. .......... 423/210; 422/168; 422/177
(58) Field of Classification Search .......... 423/210; 422/168, 177
See application file for complete search history.

(56) References Cited

U.S. PATENT DOCUMENTS

| | | | |
|---|---|---|---|
| 3,534,547 A | 10/1970 | Mebes | |
| 3,713,213 A | 1/1973 | Cranston | |
| 3,727,296 A | 4/1973 | Cranston | |
| 3,733,684 A | 5/1973 | Cranston | |
| 3,736,654 A | 6/1973 | Cranston | |
| 3,737,986 A | 6/1973 | Cranston | |
| 3,739,614 A | 6/1973 | Cranston | |
| 3,765,938 A | 10/1973 | Cranston | |
| 3,766,635 A | 10/1973 | Cranston | |
| 3,795,770 A | 3/1974 | Kato | |
| 3,966,120 A | 6/1976 | Furgalus et al. | |
| 4,077,206 A | 3/1978 | Ayyagari | |
| 4,122,674 A | 10/1978 | Andersson et al. | |
| 4,540,361 A | 9/1985 | Gagne | |
| 4,624,808 A | 11/1986 | Lange | |
| 4,675,839 A | 6/1987 | Kerr | |
| 4,685,532 A | 8/1987 | Gunness | |
| 4,781,425 A | 11/1988 | Risk et al. | |

(Continued)

FOREIGN PATENT DOCUMENTS

CN 2045073 9/1989

(Continued)

OTHER PUBLICATIONS

EP Search Report and Opinion for Application No. 12152988.7-2321, dated May 31, 2012, 5 pages.

*Primary Examiner* — Timothy Vanoy
(74) *Attorney, Agent, or Firm* — Fletcher Yoder P.C.

(57) ABSTRACT

A system includes an emissions control system. The emissions control system includes a chemical injection conduit. The emissions control system also includes a chemical injector coupled to the chemical injection conduit, wherein the chemical injector is configured to output an emissions control chemical into the chemical injection conduit. The emissions control system further includes a wave generator coupled to the chemical injection conduit, wherein the wave generator is configured to output multiple waves that propagate through the chemical injection conduit into a flow path of combustion products to drive improved mixing of the emissions control chemical with the combustion products.

20 Claims, 4 Drawing Sheets

U.S. PATENT DOCUMENTS

| | | | |
|---|---|---|---|
| 4,830,545 A | 5/1989 | Salter et al. |
| 4,833,503 A | 5/1989 | Snelling |
| 4,834,588 A | 5/1989 | Salter et al. |
| 4,844,663 A | 7/1989 | Salter et al. |
| 4,912,920 A | 4/1990 | Hirabayashi |
| 5,034,030 A | 7/1991 | Miller et al. |
| 5,059,309 A | 10/1991 | Jordan |
| 5,130,543 A | 7/1992 | Bradbeer |
| 5,168,887 A | 12/1992 | Thompson et al. |
| 5,209,821 A | 5/1993 | Shaw et al. |
| 5,213,619 A | 5/1993 | Jackson et al. |
| 5,318,570 A | 6/1994 | Hood et al. |
| 5,318,755 A | 6/1994 | Kuivalainen et al. |
| 5,324,297 A | 6/1994 | Hood et al. |
| 5,382,251 A | 1/1995 | Hood et al. |
| 5,386,689 A | 2/1995 | Bozich et al. |
| 5,419,877 A | 5/1995 | Goforth et al. |
| 5,455,606 A | 10/1995 | Keeling et al. |
| 5,481,288 A | 1/1996 | Keeling et al. |
| 5,538,539 A | 7/1996 | Spokoyny et al. |
| 5,540,755 A | 7/1996 | Spokoyny et al. |
| 5,636,982 A | 6/1997 | Santschi et al. |
| 5,645,681 A | 7/1997 | Gopalakrishna et al. |
| 5,707,483 A | 1/1998 | Nayar et al. |
| 5,785,012 A | 7/1998 | Parsons et al. |
| 5,793,513 A | 8/1998 | Fishman |
| 5,945,334 A | 8/1999 | Besemer et al. |
| 5,988,115 A | 11/1999 | Anderson et al. |
| 6,072,880 A | 6/2000 | Shipps et al. |
| 6,120,580 A | 9/2000 | Sandler |
| 6,140,044 A | 10/2000 | Besemer et al. |
| 6,161,617 A | 12/2000 | Gjedebo |
| 6,244,738 B1 | 6/2001 | Yasuda et al. |
| 6,245,134 B1 | 6/2001 | Sandler |
| 6,287,850 B1 | 9/2001 | Besemer et al. |
| 6,395,096 B1 | 5/2002 | Madanshetty |
| 6,399,365 B2 | 6/2002 | Besemer et al. |
| 6,455,456 B1 | 9/2002 | Spokoyny |
| 6,484,594 B1 | 11/2002 | Saaski et al. |
| 6,484,733 B2 | 11/2002 | Budin et al. |
| 6,532,835 B1 | 3/2003 | Saaski et al. |
| 6,551,817 B2 | 4/2003 | Besemer et al. |
| 6,571,420 B1 | 6/2003 | Healy et al. |
| 6,722,124 B2 | 4/2004 | Pawson |
| 6,733,977 B2 | 5/2004 | Besemer et al. |
| 6,801,686 B2 | 10/2004 | Sorin |
| 6,835,689 B1 | 12/2004 | He et al. |
| 6,880,402 B1 | 4/2005 | Couet et al. |
| 6,881,231 B2 | 4/2005 | Acton et al. |
| 6,886,406 B1 | 5/2005 | Couet et al. |
| 6,910,332 B2 | 6/2005 | Fellows |
| 6,925,187 B2 | 8/2005 | Norris |
| 6,966,040 B2 | 11/2005 | Ismailov |
| 6,998,616 B2 | 2/2006 | Favro et al. |
| 7,057,176 B2 | 6/2006 | Rothenfusser et al. |
| 7,122,801 B2 | 10/2006 | Favro et al. |
| 7,199,367 B2 | 4/2007 | Favro et al. |
| 7,253,551 B2 | 8/2007 | Madanshetty |
| 7,261,008 B2 | 8/2007 | Saaski et al. |
| 7,312,440 B2 | 12/2007 | Degertekin et al. |
| 7,328,574 B2 | 2/2008 | Vignassa et al. |
| 7,364,895 B2 | 4/2008 | Besemer et al. |
| 7,392,491 B2 | 6/2008 | Ismailov |
| 7,395,827 B2 | 7/2008 | Madanshetty |
| 7,491,676 B2 | 2/2009 | Augustine et al. |
| 7,517,501 B2 | 4/2009 | Odendall et al. |
| 7,528,701 B2 | 5/2009 | Adelman |
| 7,550,117 B2 | 6/2009 | Alward et al. |
| 7,572,416 B2 | 8/2009 | Alward et al. |
| 7,574,796 B2 | 8/2009 | Alward et al. |
| 7,591,271 B2 | 9/2009 | Rabitsch et al. |
| 7,613,561 B1 | 11/2009 | Stewart et al. |
| 7,625,746 B2 | 12/2009 | Patno et al. |
| 7,628,968 B2 | 12/2009 | Augustine et al. |
| 7,703,574 B2 | 4/2010 | Krüger et al. |
| 7,714,274 B2 | 5/2010 | Degertekin et al. |
| 7,777,119 B2 | 8/2010 | Stoneback |
| 7,785,544 B2 | 8/2010 | Alward et al. |
| 7,797,928 B2 | 9/2010 | Friedrich et al. |
| 7,804,598 B2 | 9/2010 | Hall |
| 7,828,901 B2 | 11/2010 | Madanshetty |
| 7,878,683 B2 | 2/2011 | Logan |
| 2002/0108631 A1 | 8/2002 | Madanshetty |
| 2002/0134402 A1 | 9/2002 | Madanshetty |
| 2003/0146310 A1 | 8/2003 | Jackson |
| 2004/0106130 A1 | 6/2004 | Besemer |
| 2004/0166525 A1 | 8/2004 | Besemer |
| 2004/0171054 A1 | 9/2004 | Besemer |
| 2004/0234089 A1 | 11/2004 | Rembrand |
| 2005/0003421 A1 | 1/2005 | Besemer |
| 2005/0084895 A1 | 4/2005 | Besemer et al. |
| 2005/0089953 A1 | 4/2005 | Besemer et al. |
| 2005/0106615 A1 | 5/2005 | Besemer et al. |
| 2005/0106617 A1 | 5/2005 | Besemer |
| 2005/0106618 A1 | 5/2005 | Besemer |
| 2005/0158819 A1 | 7/2005 | Besemer |
| 2005/0208646 A1 | 9/2005 | Besemer |
| 2006/0021642 A1 | 2/2006 | Sliva |
| 2006/0233404 A1 | 10/2006 | Croft |
| 2006/0234267 A1 | 10/2006 | Besemer |
| 2007/0119179 A1 | 5/2007 | Haynes |
| 2007/0175502 A1 | 8/2007 | Sliva |
| 2007/0175525 A1 | 8/2007 | Tessien |
| 2007/0175526 A1 | 8/2007 | Tessien |
| 2008/0093163 A1 | 4/2008 | Frederiksen |
| 2008/0112865 A1 | 5/2008 | Alward |
| 2008/0280858 A1 | 11/2008 | Hanna |
| 2009/0078175 A1 | 3/2009 | Eiteneer |
| 2009/0120336 A1 | 5/2009 | Chapin et al. |
| 2009/0124585 A1 | 5/2009 | Cross |
| 2009/0143249 A1 | 6/2009 | Besemer |
| 2009/0235851 A1 | 9/2009 | Krebs et al. |
| 2009/0247392 A1 | 10/2009 | Ghorishi |
| 2009/0293817 A1 | 12/2009 | Dean et al. |
| 2009/0301472 A1 | 12/2009 | Kim |
| 2009/0320439 A1 | 12/2009 | Chapin et al. |
| 2010/0298165 A1 | 11/2010 | Besemer et al. |
| 2010/0315645 A1 | 12/2010 | Hall et al. |
| 2011/0044903 A1 | 2/2011 | Borrelli |

FOREIGN PATENT DOCUMENTS

| | | | |
|---|---|---|---|
| CN | 2072409 | | 3/1991 |
| CN | 2792069 | | 6/2006 |
| EP | 0308026 | | 8/1991 |
| EP | 0551967 | | 8/1993 |
| EP | 0386049 | | 10/1993 |
| EP | 1007210 | | 1/2002 |
| EP | 0881367 | | 10/2002 |
| EP | 1562045 | | 8/2005 |
| EP | 1582867 | | 10/2005 |
| GB | 2432289 | | 5/2007 |
| GB | 2446547 | | 8/2008 |
| JP | 63-229125 | * | 9/1988 |
| JP | 05-168861 A | * | 7/1993 |
| WO | WO8606746 | | 11/1986 |
| WO | WO8903768 | | 5/1989 |
| WO | 94/12777 A1 | | 6/1994 |
| WO | WO9516995 | | 6/1995 |
| WO | WO9623606 | | 8/1996 |
| WO | WO0132341 | | 5/2001 |
| WO | WO0139197 | | 5/2001 |
| WO | WO0139199 | | 5/2001 |
| WO | WO0139202 | | 5/2001 |
| WO | WO2004020993 | | 3/2004 |
| WO | WO2004080574 | | 9/2004 |
| WO | WO2004105431 | | 12/2004 |
| WO | WO2005015739 | | 2/2005 |
| WO | WO2005113126 | | 12/2005 |
| WO | 2007054709 | | 8/2007 |
| WO | WO2008000096 | | 1/2008 |
| WO | WO2008006383 | | 1/2008 |
| WO | WO2009118414 | | 10/2009 |

* cited by examiner

SYSTEM AND METHOD FOR CONTROLLING EMISSIONS IN A COMBUSTION SYSTEM

BACKGROUND OF THE INVENTION

The subject matter disclosed herein relates to a system to reduce emissions in a combustion system.

Combustion of a fuel, such as a hydrocarbon fuel, produces a variety of exhaust products. For example, a compression ignition engine (e.g., diesel engine), a spark ignition internal combustion engine, and a gas turbine engine typically emit carbon dioxide ($CO_2$), oxides of sulfur ($SO_x$) oxides of nitrogen ($NO_x$), particulates and/or carbon monoxide (CO). Furthermore, the quantity and/or concentration of certain exhaust products may be limited by regulation. Therefore, certain systems attempt to reduce emissions of exhaust products to meet regulatory levels. Some of these systems inject chemicals (e.g., ammonia) to reduce these exhaust products directly or through reaction with some other catalyst. The use of these chemicals increases the cost of operating the facility, but it is important to ensure very good mixing and distribution of these chemicals throughout the exhaust products. However, the increase in cost may be further exacerbated when some of chemicals may not react with the exhaust products (e.g., due to slippage).

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an emissions control system. The emissions control system includes a chemical injection conduit. The emissions control system also includes a chemical injector coupled to the chemical injection conduit, wherein the chemical injector is configured to output an emissions control chemical into the chemical injection conduit. The emissions control system further includes a wave generator coupled to the chemical injection conduit, wherein the wave generator is configured to output multiple waves that propagate through the chemical injection conduit into a flow path of combustion products to drive mixing of the emissions control chemical with the combustion products.

In accordance with a second embodiment, a system includes an emissions reduction controller configured to control a chemical injector to output an emissions control chemical into a chemical injection conduit. The emissions reduction controller is configured to control a wave generator to output multiple waves that propagate through the chemical injection conduit into a flow path of combustion products to drive mixing of the emissions control chemical with the combustion products.

In accordance with a third embodiment, a method includes injecting an emissions control chemical into a chemical injection conduit. The method also includes generating multiple waves that propagate through the chemical injection conduit into a flow path of combustion products to drive mixing of the emissions control chemical with the combustion products.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for managing emissions or combustion products (e.g., $NO_x$) of combustions systems (e.g., boilers, furnaces, gas turbines, etc.). Certain combustions systems are associated with exhaust processing systems that inject gaseous or solid state (e.g., liquid or powder) chemicals (e.g., ammonia) to reduce emissions. Embodiments of the present disclosure provide an emissions control system to enhance the use of the chemicals to reduce emissions (e.g., improving mixing). For example, the emissions control system includes a chemical injection conduit coupled directly or indirectly to both a chemical injector and a wave generator. The chemical injector is configured to inject an emissions control chemical into the chemical injection conduit. The wave generator is configured to introduce multiple waves into the chemical injection conduit into a flow path of combustion products to drive improved mixing of the emissions control chemical with the combustion products. The emissions control chemical may mix with the combustion products in the present of a catalyst or high temperatures depending on the process to reduce emissions. The chemical injector and the wave generator may be coupled in series or parallel to the chemical injection conduit. The wave generator may include an acoustic generator (e.g., horn) to produce sound waves. The wave generator may also include a shock wave generator (e.g., pulse detonator) to produce shock waves. The generated waves may enhance mixing of the emissions control chemical with the combustion products and reduce waste of unreacted chemical.

Figure 1:
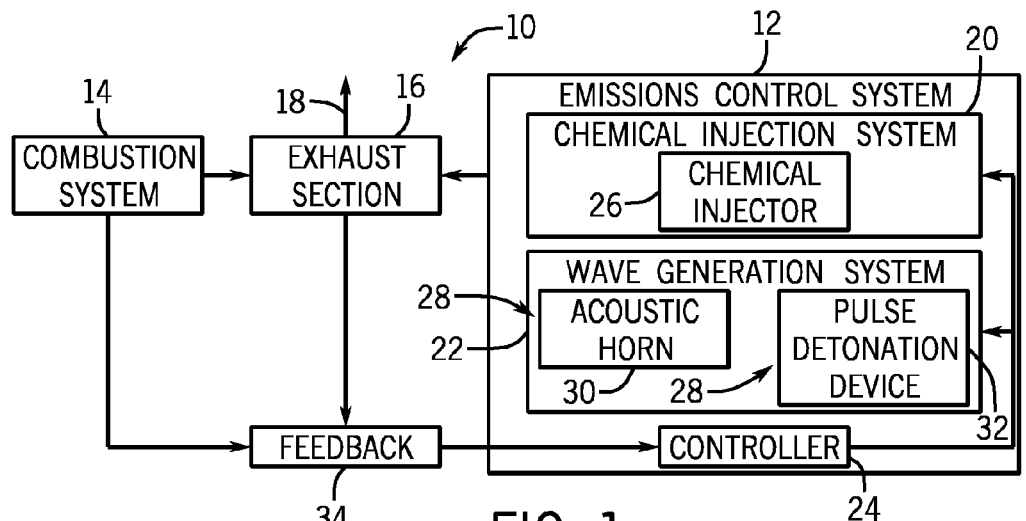
FIG. 1 is a schematic diagram of an embodiment of a system that includes an emissions control system associated with a combustion system.

Turning now to the drawings and referring to FIG. 1, a schematic diagram of an embodiment of a system 10 that includes an emissions control system 12 associated with a combustion system 14 is illustrated. The combustion system 14 may include a compression ignition engine (e.g., diesel engine), a spark ignition internal combustion engine, a gas turbine engine, a furnace, or a boiler. The combustion system 14 emits an exhaust gas. The exhaust gas flows into the exhaust section 16. The combustion system 14 may be fluidly coupled to the exhaust section 16 and, particularly, to the emissions control system 12. As a result of the combustion process, the exhaust gas may include certain byproducts, such as carbon oxides ($CO_x$), sulfur oxides ($SO_x$), nitrogen oxides ($NO_x$), particulates, mercury, and/or unburned hydrocarbons. Due to certain regulatory requirements, the exhaust section 16 may be employed to substantially reduce the concentration of such byproducts or emissions prior to releasing the exhaust gas stream into the atmosphere as indicated by arrow 18. As described in greater detail below, the exhaust section 16 may employ one or more processes to reduce emissions such as Selective Catalytic Reduction (SCR) process, Selective Non-Catalytic Reduction (SNCR) process, or other emissions reducing processes.

The emissions control system 12 includes a chemical injection system 20, a wave generation system 22, and a controller 24. The chemical injection system 20 is configured to inject one or more emissions control chemicals into a flow path of the exhaust gas stream or combustion products. The emissions control chemicals may be a gas, liquid, and/or solid reagent. For examples, the emissions control chemicals may include gaseous ammonia, liquid ammonia, urea, powdered activated carbon, lime (calcium oxide), limestone, or other reagent. The emissions control chemicals may react with certain byproducts to reduce emissions of those byproducts. For example, the ammonia or urea reacts with $NO_x$ to produce nitrogen and water and lime reacts with SOx to produce calcium sulfite or sulfate. The emissions control chemicals may mix with the combustion products in the present of a catalyst or high temperatures depending on the process to reduce emissions. As described in greater detail below, the chemical injection system 20 includes a chemical injector 26 coupled directly or indirectly to a chemical injection conduit. In certain embodiments, the chemical injector may include an injection grid (e.g., ammonia injection grid for SCR), nozzle, and/or lance.

The wave generation system 22 is coupled directly or indirectly to the chemical injection system 20. In addition, the wave generation system 22 may be coupled to the chemical injection conduit. In certain embodiments, the chemical injection system 20 and the wave generation system 22 may be independently coupled to the exhaust section 16, and thus may be separate from one another. Further, in certain embodiments, the wave generation system 22 may not be coupled to the chemical injection conduit. The wave generation system 22 is configured to generate a plurality of waves to vibrate the emissions control chemical during injection of the chemical into the flow path of the exhaust gas or combustion products. The vibrations carry over into the exhaust gas velocity and enhance mixing between emissions or byproducts within the exhaust gas and the emissions control chemical. As described in greater detail below, the wave generation system 22 includes a wave generator 28. The wave generator 28 is configured to output a plurality of waves that propagates through the chemical injection conduit into the flow path of combustion products to drive improved mixing of the emissions control chemical with the combustion products. The wave generator 28 includes an acoustic generator or horn 30 and/or a shock wave generator or pulse detonation device 32. The acoustic generator or horn 30 is configured to output the plurality of waves as sound waves. The sound wave generator or pulse detonation device 32 is configured to output the plurality of waves as shock waves. In certain embodiments, the wave generator 28 may include a single device, a grid, or an array of devices to promote mixing across the flow path of the exhaust gas.

The controller 24 is coupled both to the chemical injection system 20 and the wave generation system 22. The controller 24 (e.g., emissions reduction controller) is configured to control the chemical injector 26 to output the emissions control chemical into the chemical injection conduit. In addition, the controller 24 is configured to control the wave generator 28 to output the plurality of waves that propagates through the chemical injection conduit into the flow path of combustion products to drive improved mixing of the emissions control chemical with the combustion products. The controller 24 is responsive to feedback 34 indicative of an emissions level of one or more byproducts in the combustion products. Feedback 34 is obtained from transducers disposed throughout the combustion system 14 and the exhaust section 16. Types of feedback 34 may include temperature, pressure, unit load or output, emissions (concentration) levels of particular byproducts, fuel type used by the combustion system 14, concentration levels of unreacted emissions control chemicals, and/or other parameters. In response to the feedback 34, the controller 24 may control the rate of injection of the emissions control chemical based on target emission levels, change the actuation frequency or duration of the wave generator 28 based on slip values, or other integrated control loop activities.

The controller 24 is configured to periodically actuate the chemical injector 26 and the wave generator 28 to inject the emissions control chemical and output the plurality of waves into the combustion products. For example, the periodic actuation of the chemical injector 26 and the wave generator 28 by the controller 24 may range from every 10 seconds to 10 minutes or any other suitable periodic activation. In certain embodiments, the time between actuation may be constant. In other embodiments, the time between actuation may be variable. In response to the feedback 34, the controller 24 may adjust when the periodic actuation occurs. In addition, the controller 24 may adjust the sequencing and/or frequency of the wave generator 28 and/or the concentration of the emissions control chemical injected. Further, in embodiments employing both acoustic generators 30 and shock wave generators 32, the controller 24 may control whether the acoustic generator 30, the shock wave generator 32, or both are used. Together these components of the emissions control system 12 enhance the mixing of emissions control chemical with the combustion products to reduce emissions and reduce waste of unreacted chemical.

Figure 2:
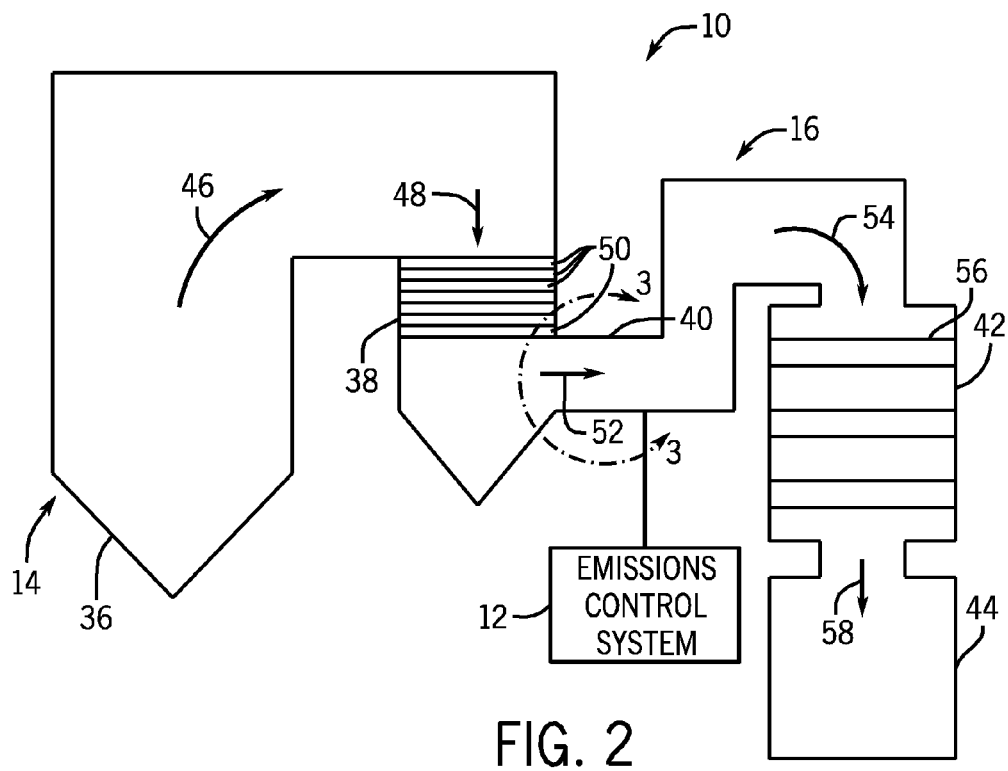
FIG. 2 is a simplified diagram of an embodiment of the system of FIG. 1 including the combustion system, an exhaust section, and the emissions control system.

FIG. 2 is a simplified diagram of an embodiment of the system 10 of FIG. 1 including the combustion system 14, exhaust section 16, and emissions control system 12. As illustrated, the combustion system 14 includes a boiler 36 (e.g., utility boiler). The exhaust section 16 includes a furnace economizer 38, an injection zone 40, a catalyst unit 42, and an air heater 44. Exhaust gas 46 generated in the boiler 36 flows through the furnace economizer 38 as indicated by arrow 48. The furnace economizer 38 includes heat exchangers 50. The heat exchangers 50 may use heat from the exhaust gas 46 to heat water or another fluid used to fill the boiler 36. From the furnace economizer 38, the exhaust gas 46 flows into the injection zone 40 as indicated by arrow 52. The injection zone 40 may include a single device or a grid or array (see FIG. 3) of chemical injectors 26 to inject the emissions control chemical to mix with the exhaust gas 46. For example, ammonia may be injected via the one or more chemical injectors 26 into the injection zone 40. As illustrated, the injection zone 40 is coupled to the emissions control system 12. However, in other embodiments, the emissions control system 16 may be located at other locations of the exhaust section 16. The emissions control system 12 enhances the mixing of the emissions control chemical and the exhaust gas 46 (e.g., ammonia with $NO_x$). The exhaust gas/chemical mixture 54 flows into the catalyst unit 42. The catalyst unit 42 (e.g., SCR unit) includes beds 56 of catalysts (e.g., oxides of base metals, zeolites, and precious metals) to promote the reaction between the byproducts (e.g., $NO_x$) within the exhaust gas 46 and the emissions control chemical (e.g., ammonia). The catalyst unit 42 may be implemented using any suitable geometry, such as a honeycomb or plate configuration. The exhaust gas 46, unreacted emissions control chemicals, and reaction products flow to the air heater 44 as indicated by arrow 58. The air heater 44 reduces unreacted emissions control chemicals (e.g., unreacted ammonia due to slippage). For example the air heater 44 may vaporize unreacted ammonia or urea prior to venting the exhaust gas to atmosphere. The embodiment in FIG. 2 is illustrative of only one embodiment of the system 10. The type of combustion system 14, the arrangement of the exhaust section 16, and/or the catalyst unit 42 may vary.

Figure 3:
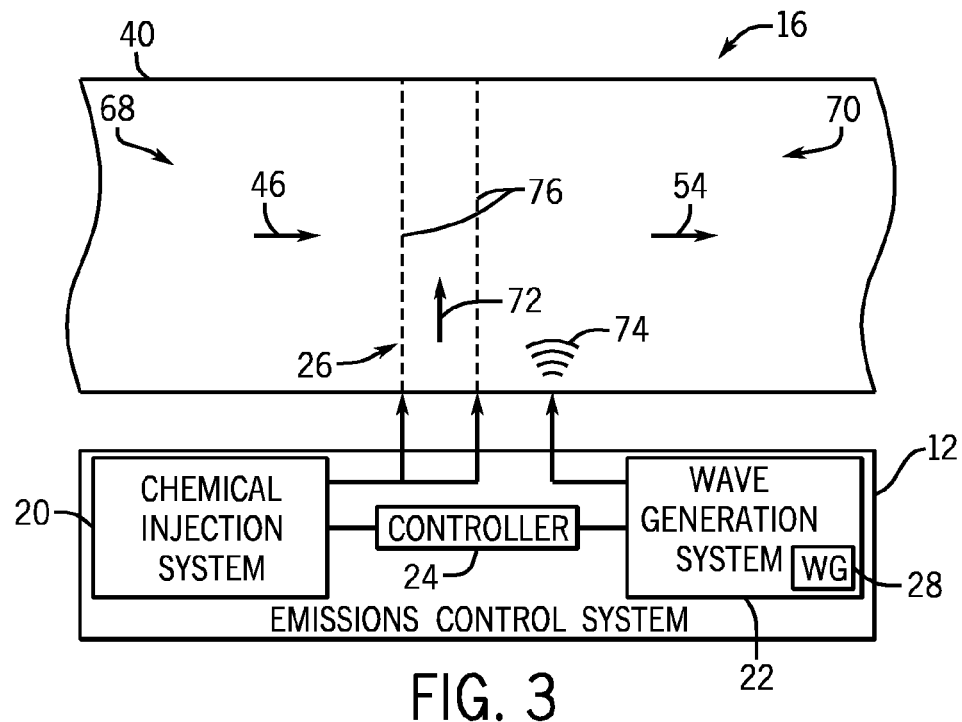
FIG. 3 is a schematic diagram of an embodiment of the emissions control system associated with the exhaust section of FIG. 2, taken within line 3-3 of FIG. 2.
Figure 4:
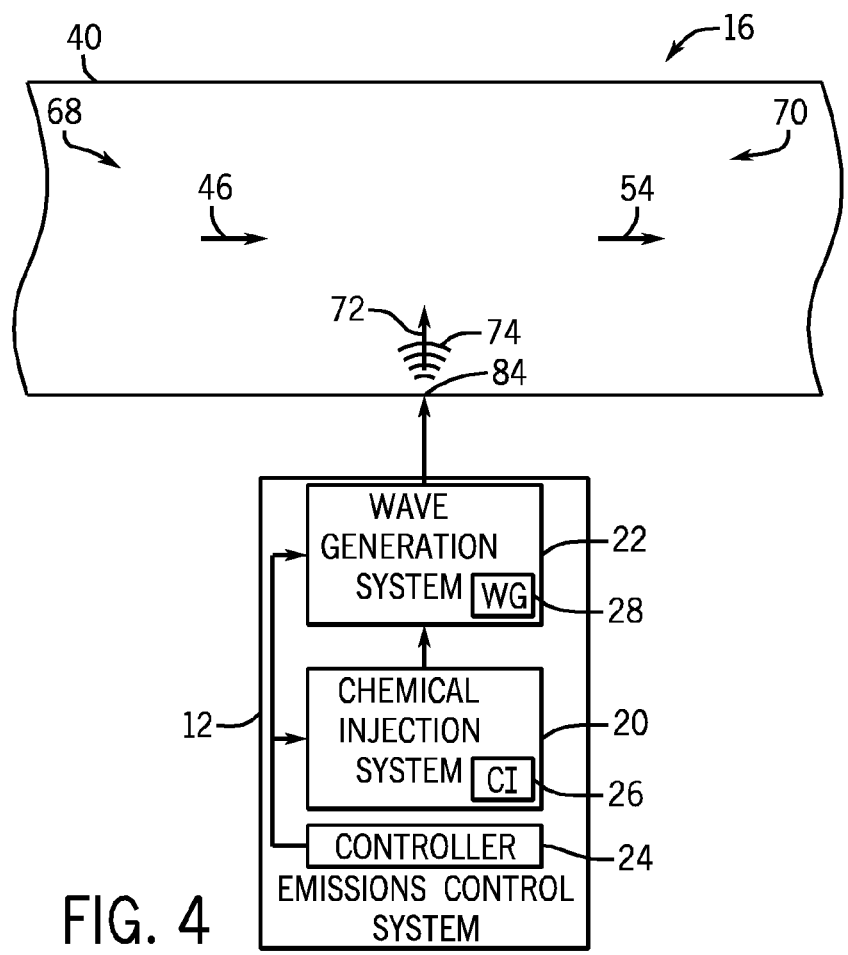
FIG. 4 is a schematic diagram of another embodiment of the emissions control system associated with the exhaust section of FIG. 2, taken with line 3-3 of FIG. 2.

FIGS. 3 and 4 are schematic diagrams of embodiments of the emissions control system 12 associated with the exhaust section 16, in particular the injection zone 40 of FIG. 2, taken within line 3-3 of FIG. 2. As mentioned above, the emissions control system 12 may be associated with other locations of the exhaust section 16. The emissions control system 12 is as described above. The injection zone 40 includes an upstream portion 68 and a downstream portion 70. The exhaust gas 46 flows into the upstream portion 68 of the injection zone 40. The emissions control system 12 injects emissions control chemical 72 into the flow of the exhaust gas 46 via the chemical injection system 20 and outputs the plurality of waves 74 to vibrate the chemicals 72 to better mix with the exhaust gas 46. The exhaust gas/chemical mixture 54 then flows through the downstream portion 70 of the injection zone 40 (e.g., to the catalyst unit 42).

FIG. 3 depicts a parallel arrangement of the chemical injector 26 and wave generator 28. As illustrated in FIG. 3, the chemical injector 26 includes an array or grid 76 for the injection of the emissions control chemical 72. For example, the grid 76 may include injection orifices at approximately 10 to 1000 locations across a passage of the flow path of exhaust gas 46. Alternatively, the grid 72 may include one or more injectors 26 about a wall of the passage. The wave generator 28 may represent a single device or a grid or array of devices. For example, one or more wave generators 28 may be separately mounted to the wall of the passage. The chemical injector 26 (i.e., grid 76) is disposed upstream from one or more wave generators 28; thus, the plurality of waves 74 vibrates the chemicals 72 after the injection of the chemicals 72 into the flow path of the exhaust gas 46. In other words, the chemical injector 26 is separate from the one or more wave generators 28. In some embodiments, the one or more generators 28 could be arranged in an opposing relationship with respect to the chemical injector 26 (i.e., disposed on opposite walls of the passage from each other).

Alternatively, as illustrated in FIG. 4, the chemical injection system 20 and the wave generation system 22 operate through a single chemical injection conduit 84 into the flow path of the exhaust gas 46. Thus, the emissions control chemical 72 and the plurality of waves 74 flow into the flow path of the exhaust gas 46 from a common point. Indeed, the chemical injection conduit 84 may also include a grid or array that includes 10 to 1000 injection orifices. Alternatively, the chemical injection system 20 and the wave generation system 22 may commonly operate through one or more chemical injection conduits 84 disposed about multiple locations of the wall of the passage. As illustrated, the wave generation system 22 and the chemical injection system 20 are coupled in series. In certain embodiments, the chemicals 72 from the chemical injector 26 may act a source to drive the wave generator 28 (e.g., acoustic generator). In some embodiments, the chemical injection system 20 and the wave generation system 22 are coupled in parallel. These embodiments of the emissions control system 12 enhance the mixing of emissions control chemical 72 with the combustion products to reduce emissions and reduce waste of unreacted chemical.

Figure 5:
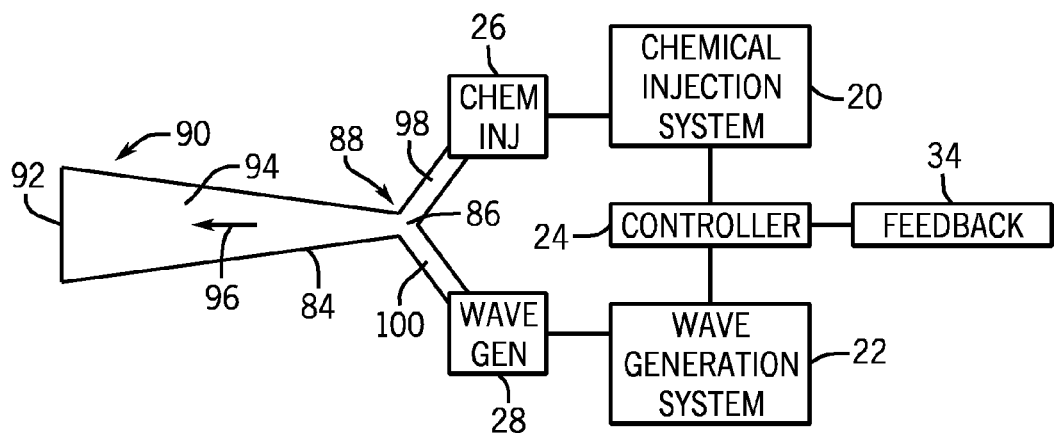
FIG. 5 is a schematic diagram of an embodiment of the emissions control system of FIG. 1.
Figure 6:
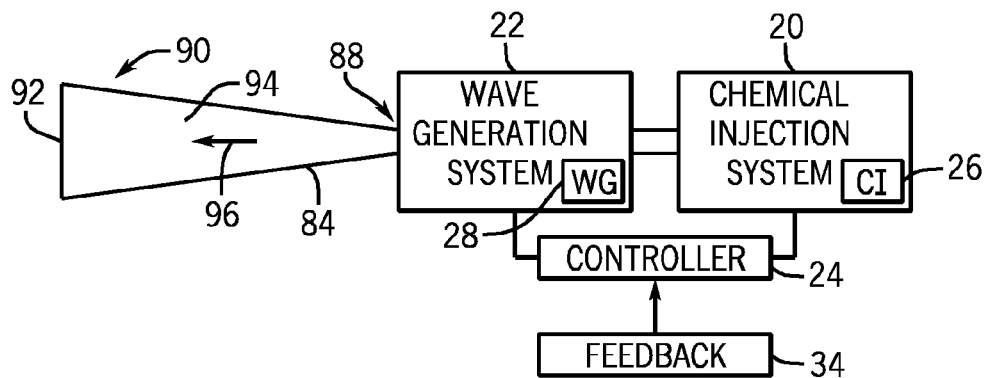
FIG. 6 is a schematic diagram of another embodiment of the emissions control system of FIG. 1.

FIGS. 5 and 6 illustrate embodiments of the emissions control system 12 that include a single chemical injection conduit 84. However, in other embodiments, the emissions control system 12 may include a plurality of chemical injection conduits 84 (e.g., a grid or array). FIG. 5 is a schematic diagram of an embodiment of the emissions control system 12 of FIG. 1. In general, the emissions control system 12 operates as described above. As illustrated, the chemical injector 26 and the wave generator 28 are coupled to the chemical injection conduit 84 in parallel via a connector 86 (e.g., Y-connector). The chemical injection conduit 84 includes an upstream portion 88 having the chemical injector 26 and the wave generator 28, a downstream portion 90 having a chemical injection outlet 92, and a diverging passage 94 that diverges from the upstream portion 88 to the downstream portion 90 in direction 96. Indeed, the connector 86 of the chemical injection conduit 84 includes first and second upstream conduit portions 98 and 100, respectively, each coupled to the downstream portion 90. The chemical injector 26 is coupled to the first upstream conduit portion 98, while the wave generator 28 is coupled to the second upstream conduit portion 100. The chemical injector 26 is configured to output the emissions control chemical into the chemical injection conduit 84. The wave generator 28 is configured to output the plurality of waves that propagates through the chemical injection conduit 84 in direction 96 into the flow path of combustion products to drive improved mixing of the emissions control chemical with the combustion products. In the illustrated embodiment, the wave generator 28 may include the acoustic wave generator 30 and/or the shock wave generator 32. As described above, the controller 24 controls the chemical injection system 20 and wave generation system 22 in response to feedback 34.

FIG. 6 is a schematic diagram of another embodiment of the emissions control system 12 of FIG. 1. The chemical injection conduit 84 is as described in FIG. 5 except the conduit 84 does not include the connector 86. As illustrated, the chemical injector 26 and the wave generator 28 are coupled to the chemical injection conduit 84 in series. In particular, the chemical injector 26 is disposed upstream from the wave generator 28 relative to the chemical injection outlet 92 of the chemical injection conduit 84. In general, the emissions control system 12 operates as described above. However, in this arrangement, the chemicals 72 from the chemical injector 26 may act as a source to drive the wave generator 28 (e.g., acoustic generator). In the illustrated embodiment, the wave generator 28 may include the acoustic wave generator 30 and/or the shock wave generator 32. Both of the embodiments in FIGS. 5 and 6 enhance the mixing of emissions control chemical with the combustion products to reduce emissions and reduce waste of unreacted chemical.

Figure 7:
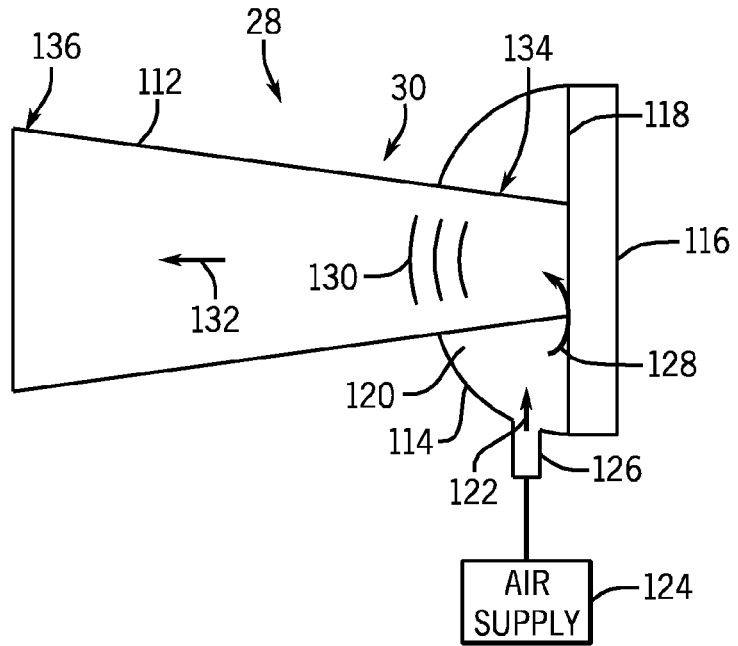
FIG. 7 is a cross-section of an embodiment of a wave generator (e.g., acoustic wave generator) of the emissions control system of FIG. 1.

As mentioned above, the wave generator 28 may include an acoustic generator 30 configured to output the plurality of waves as sound waves. FIG. 7 is a cross-section of an embodiment of the wave generator 28 of the emissions control system 12 of FIG. 1. As illustrated, the wave generator 28 includes an embodiment of the acoustic generator 30. The acoustic generator 30 includes a horn 112, a sound generating body 114, a backing cap 116, and a diaphragm 118. The diaphragm 118 may be constructed from a titanium plate or other metal sheets. The horn 112, body 114, and diaphragm 118 form a plenum 120. Compressed air 122 (e.g., 50-90 PSI) provided from an air supply 124 flows through an inlet 126 (e.g., air inlet) into the plenum 120. The air 122 flows between horn 114 and diaphragm 118, as indicated by arrow 128, causing the diaphragm 118 to vibrate. Vibration of the diaphragm 118 generates a plurality of sound waves 130 that propagate in direction 132 from an upstream portion 134 of the horn 112 to a downstream portion 136 of the horn 112. The plurality of sound waves 130 may be low frequency, high energy sound waves. The frequency of the plurality of sound waves 130 may be determined by the shape of the acoustic horn 112. The frequency of the plurality of sound waves 130 may range from 55 to 360 Hz. For example, in one embodiment, the frequency of the plurality of sound waves 130 may be 75 Hz. The configuration and design of the acoustic generator 30 may vary. Also, in certain embodiments, the emissions control chemical may be used instead of air 122 to drive the vibration of the diaphragm 118 and/or in combination with the air 122.

Figure 8:
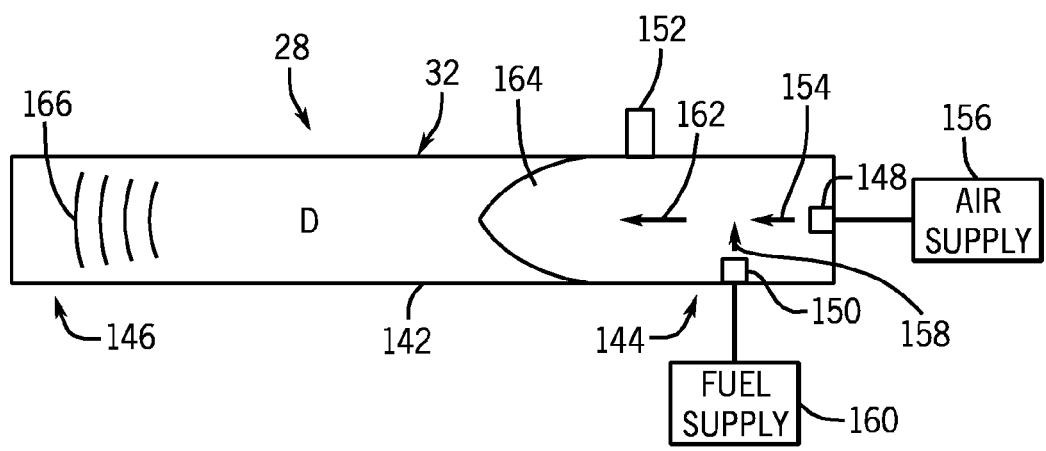
FIG. 8 is a cross-section of another embodiment of a wave generator (e.g., shock wave generator) of the emissions control system of FIG. 1.

Alternatively, as mentioned above, the wave generator 28 may include a shock wave generator 32 configured to output the plurality of waves as shock waves. FIG. 8 is a cross-section of an embodiment of the wave generator 28 of the emissions control system 12 of FIG. 1. As illustrated, the wave generator 28 includes a shock wave generator 32 (e.g., pulse detonator). The shock wave generator 32 includes a tube 142 with an upstream portion 144 and a downstream portion 146. The shock wave generator 32 includes one or more air inlets 148, one or more fuel inlets 150, and an ignition device 152 located at the upstream portion 144. Air 154 flows into the tube 142 via the one or more air inlets 148 from an air supply 156. Fuel 158 flows into the tube 142 via the one or more fuel inlets 150 from a fuel supply 160 and mixes with the air 154. A fuel/air mixture 162 flows past the ignition device 152, which ignites the mixture 162 generating a flame 164 and a detonation D. The detonation D generates a plurality of shock waves 166 that propagate towards the downstream portion 146 of the tube 142. The duration of the detonation cycle within the shock wave generator 32 may vary. For example, the duration of the detonation cycle may range from 1 second to 1 minute. The frequency of use of the shock wave generator 32 may also vary. For example, employment of the detonation cycle of the shock wave generator 32 may range from every other minute to 10 minutes or any other suitable time. The frequency of the plurality of shock waves 166 may also vary. For example, the frequency of the plurality of shock waves 166 may range from approximately 1 to 20 Hz, or any other suitable range. The embodiments of the wave generator 28 in FIGS. 7 and 8 may be employed in the emissions control system 12 described above to enhance the mixing of emissions control chemical with the combustion products to reduce emissions and reduce waste of unreacted chemical.

In certain embodiments, a method of operating an emissions control system 12 includes injecting an emissions control chemical 72 into a chemical injection conduit 84. The method also includes generating the plurality of waves 74 that propagates through the chemical injection conduit 84 into the flow path of combustion products to drive improved mixing of the emissions control chemical 72 with the combustion products. In some embodiments of the method, generating the plurality of waves 74 includes generating the plurality of sound waves 130. In other embodiments of the method, generating the plurality of waves 74 includes generating the plurality of shock waves 166. In certain embodiments, generating the plurality of waves 74 drives mixing of the emissions control chemical 72 with the combustion products prior to (i.e., upstream) a reaction with a catalyst.

Technical effects of the disclosed embodiments include systems and methods for managing emissions or combustion products (e.g., $NO_x$) of combustions systems 14 (e.g., gas turbines). The embodiments disclosed herein reduce emissions by employing the chemical injection system 20 and the wave generation system 22 together, under the control of the controller 24, to enhance mixing between the emissions control chemical 72 and the exhaust gas 46. For example, waves (e.g., sound wave or shock waves) generated by the wave generation system 22 impart vibrations in the chemical 72 to enhance mixing. Enhancing the mixing between the chemical 72 and the exhaust gas 46 may increase the amount of chemical 72 and byproducts within the exhaust gas 46 that react, reduce the amount of unreacted chemical 72, and reduce emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an emissions control system, comprising:
      a chemical injection conduit;
      a chemical injector coupled to the chemical injection conduit, wherein the chemical injector is configured to output an emissions control chemical into the chemical injection conduit; and
      a wave generator coupled to the chemical injection conduit, wherein the wave generator is configured to output a plurality of waves that propagates through the chemical injection conduit into a flow path of combustion products to drive mixing of the emissions control chemical with the combustion products.

2. The system of claim 1, wherein the chemical injection conduit comprises an upstream portion having the chemical injector and the wave generator, a downstream portion having a chemical injection outlet, and a diverging passage that diverges from the upstream portion to the downstream portion.

3. The system of claim 1, wherein the chemical injector and the wave generator are coupled to the chemical injection conduit in series.

4. The system of claim 3, wherein the chemical injector is disposed upstream from the wave generator relative to a chemical injection outlet of the chemical injection conduit.

5. The system of claim 1, wherein the chemical injector and the wave generator are coupled to the chemical injection conduit in parallel.

6. The system of claim 5, wherein the chemical injection conduit comprises first and second upstream conduit portions each coupled to a downstream conduit portion, the chemical injector is coupled to the first upstream conduit portion, and the wave generator is coupled to the second upstream conduit portion.

7. The system of claim 1, wherein the wave generator comprises an acoustic generator configured to output the plurality of waves as sound waves.

8. The system of claim 7, wherein the acoustic generator comprises a horn.

9. The system of claim 1, wherein the wave generator comprises a shock wave generator configured to output the plurality of waves as shock waves.

10. The system of claim 9, wherein the shock wave generator comprises a pulse detonator.

11. The system of claim 1, comprising a combustion system coupled to the emissions control system.

12. The system of claim 11, wherein the combustion system comprises an engine, a furnace, a boiler, or a combination thereof.

13. A system, comprising:
an emissions reduction controller configured to control a chemical injector to output an emissions control chemical into a chemical injection conduit, and the emissions reduction controller is configured to control a wave generator to output a plurality of waves that propagates through the chemical injection conduit into a flow path of combustion products to drive mixing of the emissions control chemical with the combustion products.

14. The system of claim 13, wherein the emissions reduction controller is responsive to feedback indicative of an emissions level in the combustion products.

15. The system of claim 13, wherein the emissions reduction controller is configured to periodically actuate the chemical injector and the wave generator to inject the emissions control chemical and output the plurality of waves into the combustion products.

16. The system of claim 13, wherein the emissions reduction controller is configured to control the wave generator to output the plurality of waves as sound waves or shock waves.

17. The system of claim 13, comprising the chemical injector and the wave generator, wherein the wave generator comprises an acoustic generator or a shock wave generator.

18. A method, comprising:
injecting an emissions control chemical into a chemical injection conduit; and
generating a plurality of waves that propagates through the chemical injection conduit into a flow path of combustion products to drive mixing of the emissions control chemical with the combustion products.

19. The method of claim 18, wherein generating the plurality of waves comprises generating a plurality of sound waves or a plurality of shock waves.

20. The method of claim 18, wherein generating the plurality of waves drives mixing of the emissions control chemical with the combustion products prior to a reaction with a catalyst.

* * * * *